US010812985B2

(12) United States Patent
Mody et al.

(10) Patent No.: US 10,812,985 B2
(45) Date of Patent: Oct. 20, 2020

(54) SPECTRUM SHARING SYSTEM AND METHOD THEREOF

(71) Applicant: BAE Systems Information and Electronic Systems Integration Inc., Nashua, NH (US)

(72) Inventors: Apurva N. Mody, Chelmsford, MA (US); Kenneth Carrigan, Stafford, VA (US); Jack Chuang, Merrimack, NH (US); Alex Lackpour, Haddonfield, NJ (US); Matthew J. Sherman, Succasunna, NJ (US); Alan M. Rosenwinkel, Haddonfield, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 76 days.

(21) Appl. No.: 16/224,253

(22) Filed: Dec. 18, 2018

(65) Prior Publication Data
US 2020/0187013 A1    Jun. 11, 2020

Related U.S. Application Data

(62) Division of application No. 15/068,085, filed on Mar. 11, 2016, now Pat. No. 10,158,999.

(Continued)

(51) Int. Cl.
*H04W 16/14*    (2009.01)
*G01S 7/02*     (2006.01)
(Continued)

(52) U.S. Cl.
CPC ............ *H04W 16/14* (2013.01); *G01S 7/003* (2013.01); *G01S 7/023* (2013.01); *H04K 3/20* (2013.01);
(Continued)

(58) Field of Classification Search
CPC .............. H04W 16/14; H04W 72/082; H04W 72/1244; H04B 1/06; H04L 13/0062;
(Continued)

(56) References Cited

U.S. PATENT DOCUMENTS

| 7,024,188 | B2 * | 4/2006 | Khun-Jush | H04W 16/14 342/18 |
| 8,730,088 | B2 * | 5/2014 | Milligan | G01S 7/006 342/175 |
| 9,832,791 | B2 * | 11/2017 | Ngo | H04W 16/14 |
| 10,158,999 | B2 * | 12/2018 | Mody | H04W 16/14 |

(Continued)

OTHER PUBLICATIONS

IEEE 802.22-2011™ Commercial Standard.
(Continued)

*Primary Examiner* — Magdi Elhag
(74) *Attorney, Agent, or Firm* — Scott J. Asmus; Sand, Sebolt & Wernow LPA

(57) ABSTRACT

A spectrum sharing system includes an advanced beacon (e.g. a low latency RF link) as part of an information sharing subsystem. The advanced beacon signal carries radar spectrum transmission schedule in an obfuscated way such as not to reveal the geolocation of the radar. The information sharing subsystem directs nodes, such as cell phones, to share spectrum based on spectrum sharing instructions contained in the advanced beacon. The spectrum sharing system permits out-of-band sharing of spectrum white space, as well as sharing of in-band spectrum gray space.

16 Claims, 9 Drawing Sheets
(2 of 9 Drawing Sheet(s) Filed in Color)

Related U.S. Application Data

(60) Provisional application No. 62/132,057, filed on Mar. 15, 2015.

(51) Int. Cl.
*G01S 7/00* (2006.01)
*H04L 5/00* (2006.01)
*H04K 3/00* (2006.01)

(52) U.S. Cl.
CPC .......... *H04L 5/0023* (2013.01); *H04L 5/0051* (2013.01)

(58) Field of Classification Search
CPC ..... H04L 5/0023; H04L 5/0051; G01S 7/003; G01S 7/023; H04K 3/20
See application file for complete search history.

(56) References Cited

U.S. PATENT DOCUMENTS

| | | |
|---|---|---|
| 2014/0274103 A1 | 9/2014 | Steer et al. |
| 2015/0296413 A1 | 10/2015 | Sadek et al. |
| 2015/0326372 A1 | 11/2015 | Ghosh |
| 2015/0382398 A1 | 12/2015 | Guo |
| 2016/0037544 A1 | 2/2016 | Wang |
| 2016/0219598 A1 | 7/2016 | Ghosh et al. |
| 2016/0286549 A1 | 9/2016 | Abraham et al. |

OTHER PUBLICATIONS

IEEE 802.22.1-2010™ Commercial Standard.
NTIA, Department of Commerce, An Assessment of the Near-Term Viability of Accommodating Wireless Broadband Systems in the 1675-1710 MHz, 1755-1780 MHz, 3500-3650 MHz, and 4200-4220 MHz, 4380-4400 MHz Bands, Oct. 2010, United States of America.
Mark Holmes, The Defense Case for the C-Band, Via Satellite, Jul. 13, 2007.
Robert Ames et al., Field Test Report WiMAX Frequency Sharing with FSS Earth Stations, Satellite Users Interference Reduction Group, Inc., Feb. 2008.
Apurva N. Mody, Ken Carrigan, Radar Comms Spectrum Sharing in 3.5 GHz Bands Using IEEE 802.22.1 Advanced Beaconing, WSRD, 2012.
G. Chouinard, RF Sensing in TV WhiteSpace, 8th Conference on Communications Networks and Services Research, McGill University, Montreal, Canada, May 12-14, 2010.
Apurva N. Mody et al., Machine Learning based Cognitive Communications in White as well as the Gray Space, Military Communications Conference, Orlando, FL, United States of America, Oct. 29-31, 2007.
Chad M. Spooner, Apurva N. Mody et al., Tunnelized Cyclostationary Signal Processing: A Novel Approach to Low-Energy Spectrum Sensing, Military Communications Conference, San Diego, CA, United States of America, Nov. 18-20, 2013.
Apurva N. Mody et al., On Making the Current Military Radios Cognitive without Hardware or Firmware Modifications, Military Communications Conference, San Jose, CA, United States of America, Oct. 31-Nov. 3, 2010.
Apurva N. Mody et al., Security in Cognitive Radio Networks: An Example Using Commercial IEEE 802.22 Standard, Military Communications Conference, Boston, MA, United States of America, Oct. 18-21, 2009.
Executive Office of the President, President's Council of Advisors on Science and Technology, Realizing the Full Potential of Government-held Spectrum to Spur Economic Growth, Report to the President, Washington, D.C., United States of America, Jul. 2012.

\* cited by examiner

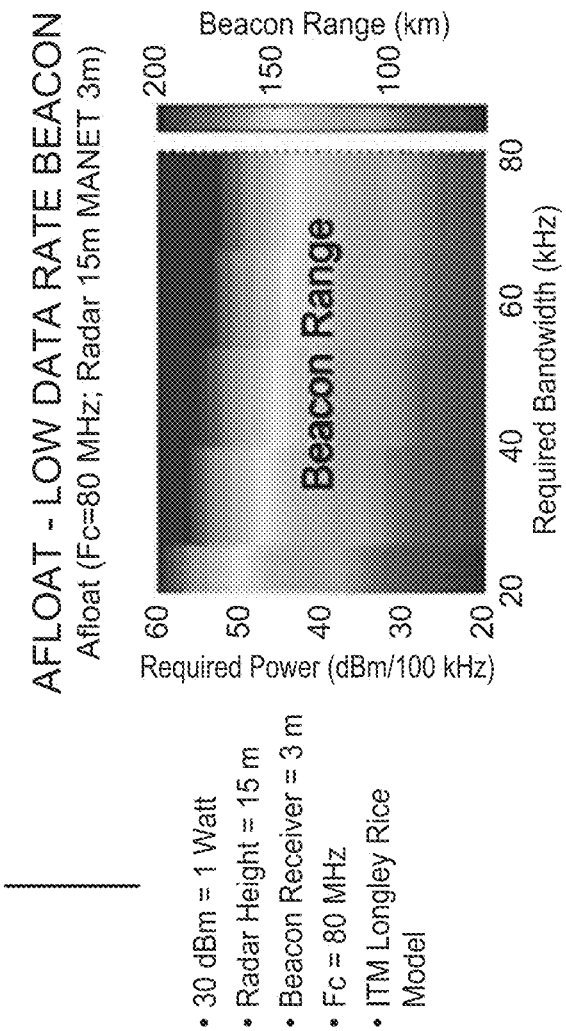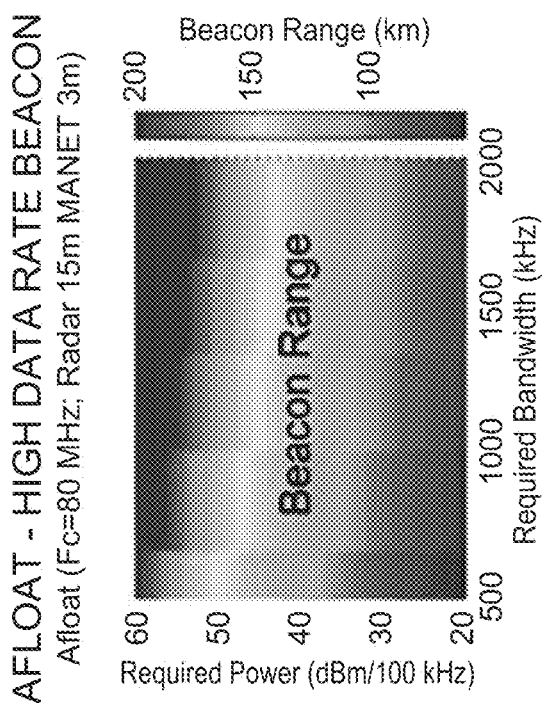
FIG. 5

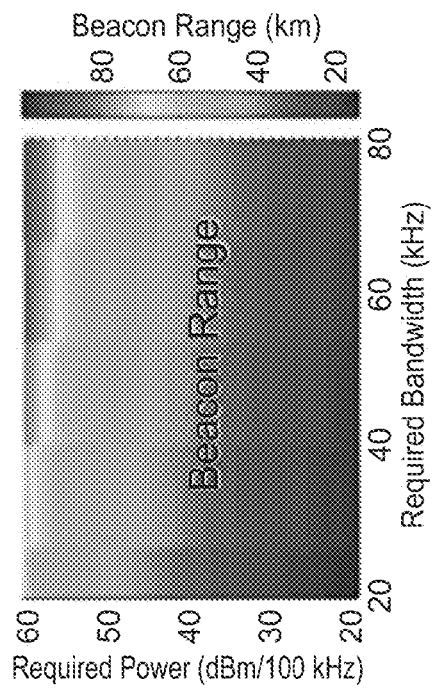
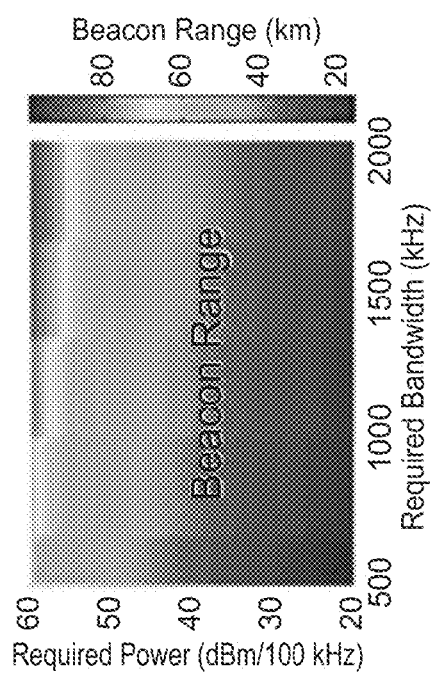
FIG. 6

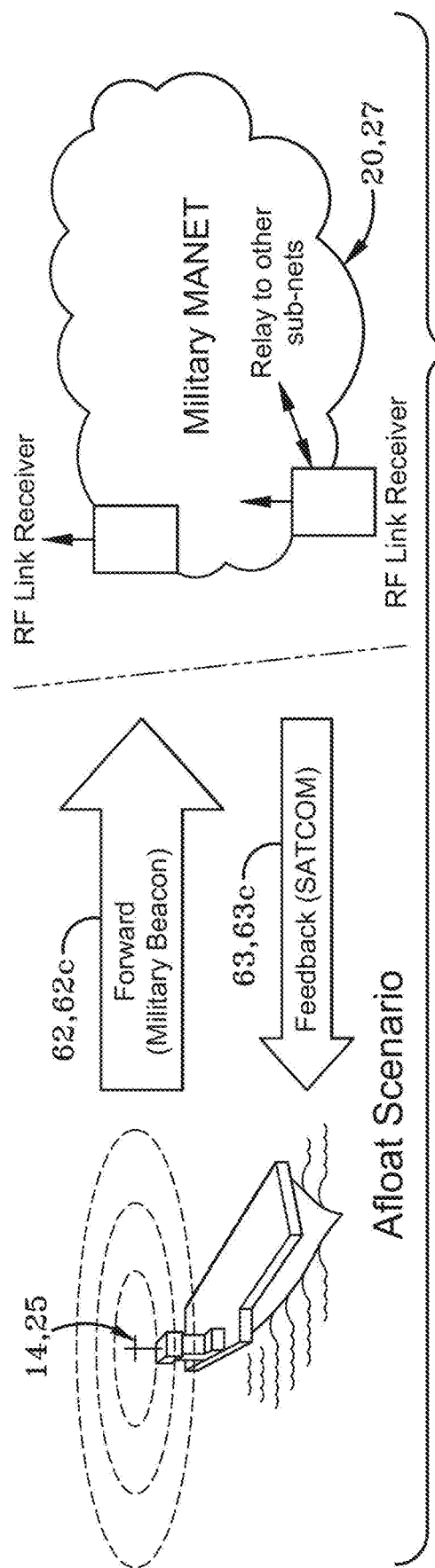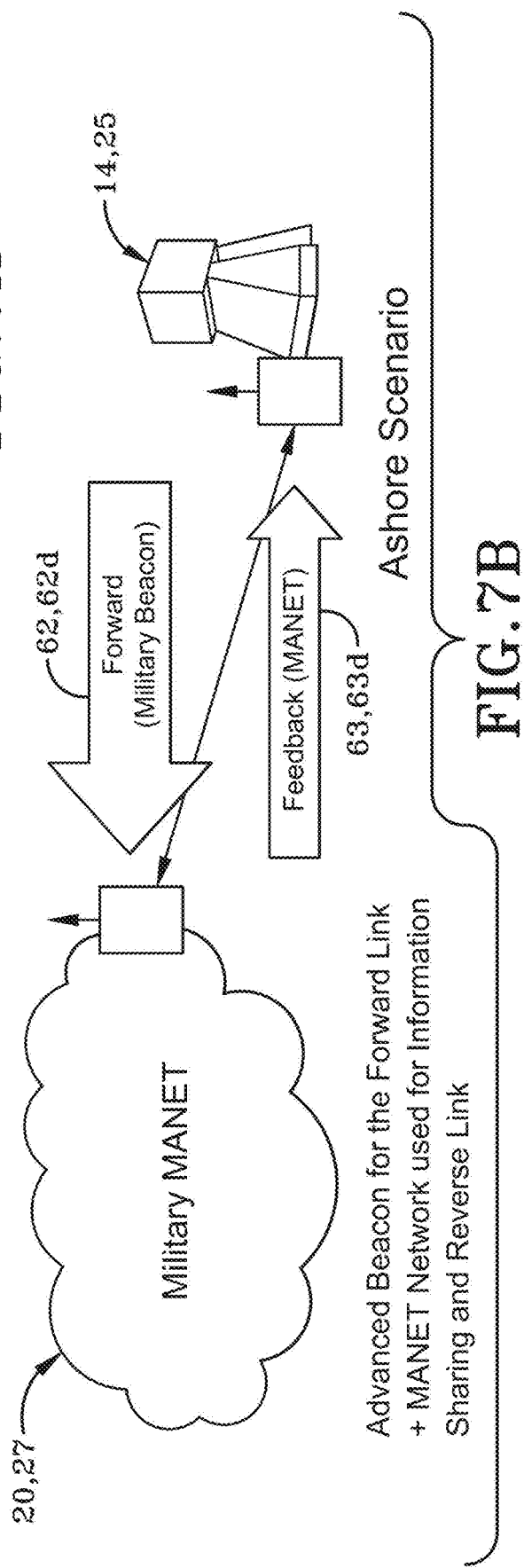

SPECTRUM SHARING SYSTEM AND METHOD THEREOF

CROSS REFERENCE TO RELATED APPLICATIONS

The present disclosure claims benefit of U.S. provisional application Ser. No. 62/132,057 filed on Mar. 12, 2015; the entirety of which is hereby incorporated by reference. This application is a divisional of U.S. patent application Ser. No. 15/068,085, filed on Mar. 11, 2016, which is also incorporated by reference in its entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. HR0011-13-C-0082 awarded by the Defense Advanced Research Projects Agency.

BACKGROUND

Technical Field

The present disclosure relates to wireless communications and more particularly to methods and systems for enabling spectrum sharing between radar and communications systems using advanced beacons and information sharing subsystem.

Background Information

In the United States, the Federal Communications Commission (FCC) defines "Spectrum" as the range of electromagnetic radio frequencies used to transmit sound, data, and video across the country. For example, spectrum carries voice between cell phones, television shows from broadcasters to a television, and online information from one computer to the next, wirelessly.

The FCC and the National Telecommunications and Information Administration (NTIA) share responsibility for managing the spectrum. NTIA manages spectrum used by the government (e.g., military, NASA) and the FCC is responsible for spectrum used by others, including individuals (e.g., garage door openers and wireless Internet connections), commercial operators (e.g., radio and television broadcasters, mobile phone providers), and public safety and health officials (e.g., police and emergency medical technicians).

Currently, frequency bands are reserved for different uses. For example, 88-108 MHz is used to broadcast FM radio. Whereas, one of the groups of frequency bands used for cell phones is 824-849 MHz and 869-894 MHz.

The FCC indicates that because there is a finite amount of spectrum and a growing demand for it, effectively managing the available spectrum is an important priority for the FCC. Further, the exponential growth of cellular wireless services has increased the large demand for spectrum resources. This cellular wireless growth has resulted in increasing pressure on government and military systems that have traditionally enjoyed unfettered and unrestricted access to spectrum.

However, some of this spectrum belonging to radar systems has been auctioned off to commercial wireless systems in some parts of the world. As a result, it has become difficult for certain radars to operate in these bands at these locations to conduct their missions. In some other parts of the world (e.g., United States), it has been projected that upwards of 1 GHz of spectrum will be needed to meet the needs of the commercial wireless systems. The U.S. Government is looking into new avenues to find spectrum to meet this need. A report from the U.S. President's Council of Advisors on Science and Technology (PCAST) suggests that sharing of the Government held spectrum is one of the ways by which the needs of the commercial wireless systems could be met. Radars are one such example of military systems that may allow sharing of their spectrum, provided, they are still the primary users of the spectrum, and wireless communications systems cause no harm to their operation.

It is believed that other governments have also been looking for new ways of utilizing spectrum to meet the needs of their government and military systems, as well as the burgeoning demand from commercial mobile operators. Spectrum sharing between various systems has been an on-going subject of discussions. One such example of spectrum sharing can be found in the use of Television (TV) Band White Spaces (54-88 MHz, 176 MHz-216 MHz and 470 MHz to 862 MHz) where communications systems can use the un-used channels by the TV broadcast services as long as they obey certain regulations, so as not to cause harmful interference to the TV broadcast receivers. The TV Band White Spaces regulations includes the use of a database service, that the communications devices must access, and provide their location, transmit power, antenna height and other information. Based on the operation of protected devices in that area and the protection contours that have been determined, the database services computes the available channels for the White Space (Communications) Devices (WSDs) and conveys this information using internet services to the WSDs. The WSDs can then operate on these available channels. Another example of commercial communications systems sharing the spectrum with radars can be found in the 5.8 GHz band. In this case, the communications devices (e. g. IEEE 802.11 Wi-Fi®) need to sense for radar signals. The typical characteristics of the radar signals have been provided to the commercial wireless community. If the commercial wireless devices detect the presence of these radar signals, they need to vacate the channel based on some known Dynamic Frequency Selection (DFS) algorithm. However there are known issues with DFS. If a device is misconfigured, it will not implement DFS correctly, and may cause interference to radars. Typically, there is no "positive control" of the WiFi devices. In addition, DFS is not very flexible. There is one "policy" which is that if a radar is sensed, the wireless systems must vacate the channel. There is no way to vary the sharing policy based on the current situation, or type of wireless device, etc.

In the two examples provided, either the primary users of the spectrum are known to occupy the same channel for long time durations (e. g. TV Band Broadcasting equipment) in which case, database enabled spectrum sharing was feasible, or, it was possible to provide the radar (e. g. Weather Radar in 5.8 GHz Band) signatures to the commercial wireless devices which would then only sense for those signals.

In some cases however, radar operation and signatures cannot be easily shared with the commercial entities. This could be, when the radars are used for government and military use. In such cases, the detailed radar operation as well as signatures bear classification grade which prohibits their dissemination to commercial entities, leave alone entities that may exist in other countries. In addition, radar has a highly directional beam pattern that can change its orientation spatially on milliseconds (ms) timescales, as well as the radar pulses can hop in the frequency domain. So while in TV band, it is possible for spectrum to be shared using databases since the TV broadcast equipment does not change the frequency of its operation, it is difficult to have a database enabled spectrum sharing with radars that are used to hop over the entire available frequency band, without constraining the radar operation and hence reducing its performance.

Spectrum sensing is possible for co-existence, where communications devices sense for radar pulses, and if detected, choose to follow the guidelines as defined by the local regulations (e.g.: ceasing operation on that channel). However, that is not optimal use of the spectrum.

SUMMARY

The previous spectrum sharing methods wasted spectrum because those methods based their sharing techniques on an inflexible binary approach (e.g.: communications devices are allowed or dis-allowed to use a channel). Thus, issues continue to exist with the demand for spectrum resources as communication technology advances. Particularly, spectrum sharing with government and military radars is challenging. Yet, sharing the radar spectrum is important. Firstly, sharing the radar spectrum between commercial devices and military radars could open up nearly 400 MHz of spectrum for commercial use. Secondly, in some countries, this spectrum has already been allocated to the commercial cellular operators for their services. As a result, it is not easy for radars to operate in these bands. Finding ways in which both radar and communications systems can share this spectrum may create a win-win situation for both these services. Thus, government controlled yet unused portions of the spectrum may be utilized to satisfy some of the demand for spectrum resources. The present disclosure addresses these and other issues.

The present disclosure will allow military radars to share spectrum with other military and commercial wireless communications systems. In some parts of the world, this will allow military radars to operate in the spectrum that has otherwise been allocated to commercial cellular wireless and satellite services. In other parts of the world, this will result in greater than 400 MHz of additional spectrum to be available for radar and communications dual use. This technique will enable sharing between military and commercial systems for enhanced spectral utilization and efficiency.

This disclosure relates to the concept of advanced beaconing in the form of an information sharing subsystem (ISS) to enable spectrum sharing between radar and wireless communications systems. This disclosure will enable spectrum sharing between radar and communications systems. In particular, this technique provides a co-existence mechanism by which spectrum sharing information can be provided by the radar to the communications system in a timely and secure fashion to enable efficient spectrum utilization.

In one aspect, the disclosure provides a spectrum sharing system, which includes an advanced beacon (e.g.: a low latency RF link) as part of an information sharing subsystem. The advanced beacon signal carries part or whole of the radar spectrum transmission schedule in an obfuscated way such as not to reveal the geolocation of the radar, but it conveys enough information for the communication systems to determine how to use the spectrum. The information sharing subsystem directs nodes, such as cell phones, to share spectrum based on spectrum sharing instructions contained in the advanced beacon. The spectrum sharing system permits out-of-band sharing of spectrum white space, as well as sharing of in-band spectrum gray space.

In another aspect, the disclosure may provide a method of sharing spectrum (from the viewpoint of the radar and the beacon transmitter) including: providing a radar transmission schedule in a first portion of spectrum to a beacon transmitter without providing the actual geolocation of the radar; sending a beacon signal from the beacon transmitter, wherein the beacon transmitter is part of an information sharing subsystem, and wherein the beacon signal carries spectrum sharing instructions from the information sharing subsystem to a node desiring to share to the first portion of the spectrum with the radar, wherein the sharing instructions include one of the following: (i) in-band spectrum sharing instructions and (ii) out of band spectrum sharing instructions; receiving the beacon signal at a beacon receiver, wherein the beacon receiver is part of the information sharing subsystem, and wherein the beacon receiver is operatively coupled to the node; if the sharing instructions include in-band sharing instructions, then beacon receiver directs the node to occupy spectrum gray space in the first portion of the spectrum and directing the node to exit the first portion of the spectrum when the first portion of the spectrum needs to be re-occupied by the radar; and if the sharing instructions includes out-of-band sharing instructions, then directing the node to occupy the spectrum white space adjacent the first portion of the spectrum that are not occupied by the radar; wherein the method of sharing spectrum is adapted to prevent signal interference by requiring the node to leave a portion of the spectrum desired to be re-occupied by radar before any interference can occur.

In another aspect, the disclosure provides a method of sharing spectrum (from the viewpoint of the node and the beacon receiver) including: receiving a beacon signal at a beacon receiver, wherein the beacon signal includes spectrum sharing instructions to share a first portion of the spectrum with a radar based on a radar transmission schedule in the first portion of the spectrum, wherein the sharing instructions include one of the following: (i) in-band spectrum sharing instructions and (ii) out of band spectrum sharing instructions; directing a node to occupy the first portion of the spectrum based on the spectrum sharing instructions, wherein if the sharing instructions include in-band sharing instructions, then beacon receiver directs the node to occupy spectrum gray space in the first portion of the spectrum and directing the node to exit the first portion of the spectrum when the first portion of the spectrum needs to be re-occupied by the radar; and if the sharing instructions includes out-of-band sharing instructions, then directing the node to occupy the spectrum white space adjacent the first portion of the spectrum that are not occupied by the radar; and wherein the method of sharing spectrum is adapted to prevent signal interference by requiring the node to leave a portion of the spectrum desired to be re-occupied by radar before any interference can occur.

In another aspect, an embodiment of the present disclosure provides a spectrum sharing system including: a beacon receiver configured to receiving a beacon signal generated from a beacon transmitter, the beacon signal carrying information of a radar transmit schedule and the beacon signal carrying spectrum sharing instructions including one of the following: (i) in-band spectrum sharing instructions and (ii) out of band spectrum sharing instructions; and an electrically communicative node operatively coupled with the beacon receiver configured to receive the spectrum sharing instructions, wherein if the sharing instructions include in-band sharing instructions, then the node occupies spectrum gray space in a first portion of the spectrum and the node exits the gray space in the first portion of the spectrum when the first portion of the spectrum needs to be re-occupied by the radar; and if the sharing instructions include out-of-band sharing instructions, then the node occupies spectrum white space adjacent the first portion of the spectrum that is not occupied by the radar and the node exits the white space adjacent the first portion of the spectrum when the first portion of the spectrum needs to be re-occupied by the radar.

BRIEF DESCRIPTION OF THE SEVERAL VIEWS OF THE DRAWINGS

The patent or application file contains at least one drawing executed in color (particularly FIG. 5 and FIG. 6). Copies of this patent or patent application publication with color drawing(s) will be provided by the Office upon request and payment of the necessary fee.

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 5 (FIG. 5) is a pair of color graphs depicting beacon range in an afloat scenario based on signal power and signal frequency, and depicting other exemplary features;

FIG. 6 (FIG. 6) is a pair of color graphs depicting beacon range in an ashore scenario based on signal power and signal frequency, and depicting other exemplary features;

FIG. 7A (FIG. 7A) depicts military ISS components for the afloat scenario according to one embodiment;

FIG. 7B (FIG. 7B) depicts military ISS components for the ashore scenario according to one embodiment;

Similar numbers refer to similar parts throughout the drawings.

DETAILED DESCRIPTION

The present disclosure provides a solution that enables spectrum co-existence between any radar and other communications systems. One exemplary embodiment provides an Information Sharing Subsystem (ISS) that enables government controlled radar and commercial communications systems to exchange operating parameters to share the spectrum. As used herein, government refers to any governmental body in the United States or elsewhere that controls or manages radars, communication systems and spectrum including federal and state agencies and the military, as compared to the commercial entities that manage the same.

Figure 1:
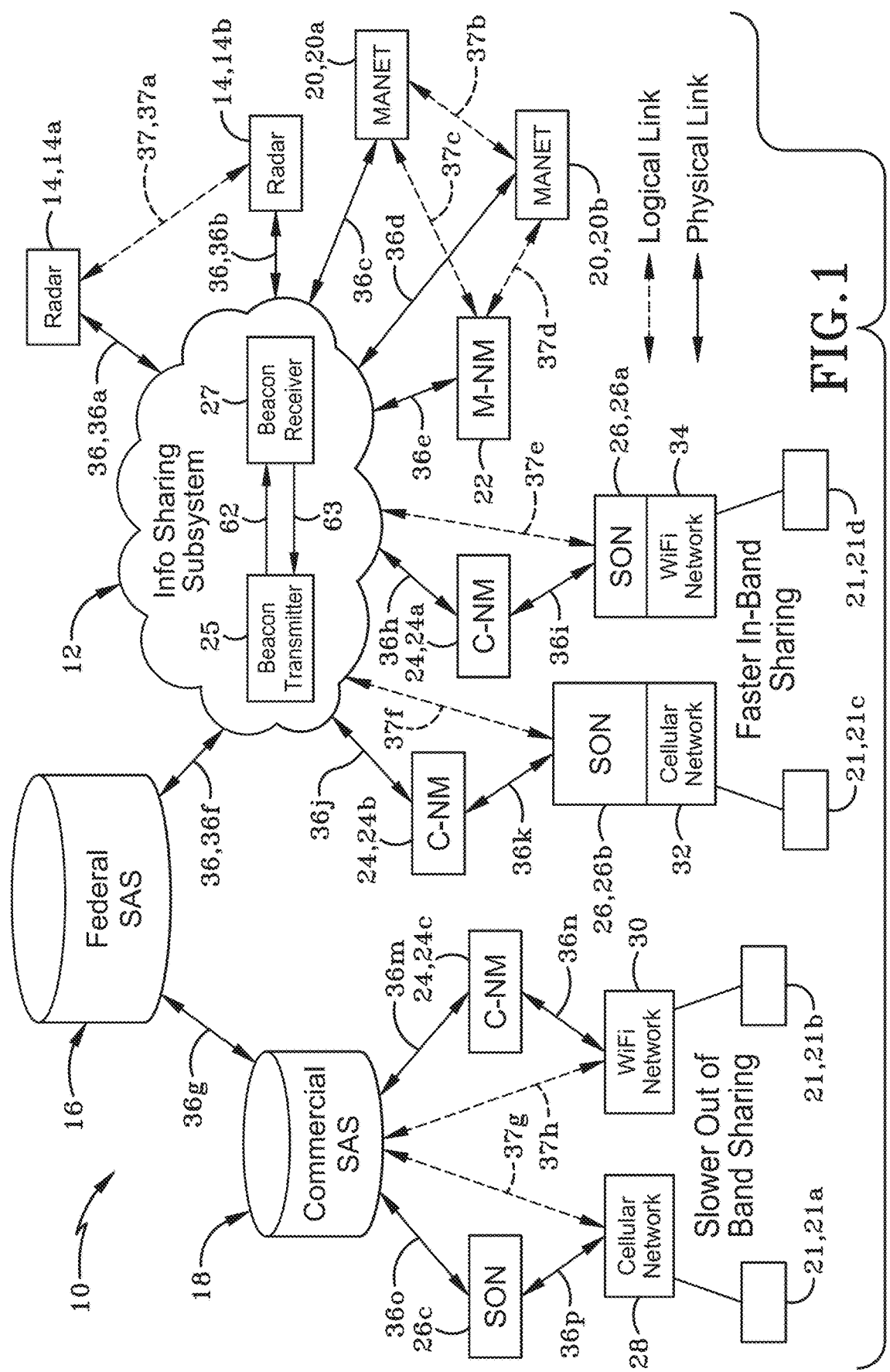
FIG. 1 (FIG. 1) is a generic representation of a spectrum sharing system of the present disclosure according to one embodiment.

As depicted in FIG. 1, a system for radar and communications spectrum sharing is generally depicted at 10. System 10 may include an ISS 12, one or more radars 14, a government spectrum access system 16, a commercial spectrum access system 18, one or more military Mobile Adhoc Network (MANET) nodes 20, one or more commercial nodes 21 (e.g.: Wi-Fi nodes, cellular base stations or a mobile phone), one or more military communications nodes network manager 22, one or more commercial communication nodes network manger 24, one or more self-organizing networks (SON) 26, a slower out-of-band sharing cellular network 28, a slower out-of-band sharing WiFi network 30, a faster in-band sharing cellular network 32, and a faster in-band sharing WiFi network 34. There may be a plurality of physical links 36 and logic links 37 operatively coupling various components of system 10.

ISS 12 includes a beacon transmitter 25 and a beacon receiver 27. The beacon transmitter 25 generates a beacon signal 62 based on obfuscated radar schedule provided to the transmitter. A slower feedback signal 63 may be transmitted back from the beacon receiver 27 to the beacon transmitter 25.

Within the scope of this definition, the term "physical link" refers to an actual connection using a physical medium (e. g. wireless, optical or cable) to connect two nodes in a network. The term "logical link" refers to connectivity where data may be routed from one node to another node via some combination of physical links.

ISS 12 is operatively connected to the one or more radars 14. A physical link 36 may connect ISS 12 to a first radar 14a. Another physical link 36b may connect ISS 12 to a second radar 14b. First radar 14a may be operatively coupled with second radar 14b through logic link 37a. Radar 14 operates in a predetermined spectrum allocation. The radars 14 provide the radar operating schedule within that predetermined spectrum to the beacon transmitter. The beacon transmitter (or additional beacon generating logic) then generates the beacons signal based on the radar operating schedule made available to the beacon transmitter. The radar operating schedule is obfuscated in a manner that prevents commercial operators from predicting the radar operation. The beacon signal is designed such that it is difficult to geolocate its source.

ISS 12 is operatively connected to the government spectrum access system 16 through a physical link 36f. Government spectrum access system 16 is operatively connected to commercial spectrum access system 18 through a physical or a logical link 36g. While FIG. 1 does not depict a direct link between commercial spectrum access system 18 and ISS 12, it is entirely possible that the two may be linked through either a physical link or a logic link.

In some implementations, the beacon receiver 27 interfaces with either the government spectrum access system 16 or with the commercial spectrum access system 18 to receive the beacon signal that was generated and sent by the beacon transmitter 25. The beacon receiver may also interface directly with the military MANET or a commercial communications system (e.g.: one beacon receiver per a geographical area commercial network).

ISS 12 is operatively connected to the one or more military MANET nodes 20. A physical link 36c may operatively connect a first military MANET node 20a to ISS 12. Another physical link 36d may operatively connect a second military MANET node 20b to ISS 12. First military MANET node 20a may be operatively connected to second military MANET node through logical link 37b. In some implementations, the beacon receiver is implemented in one of the military nodes 20. Wherein the beacon receiver receives the beacon signal containing the radar schedule and the beacon receiver then informs the military node 20 the available time or frequencies available for spectrum sharing.

ISS 12 is operatively connected to the one or more military communications nodes network manager 22 through a physical link 36. Military communications nodes network manager 22 may be operatively connected to the first military MANET node 20a through a logic link 37c and military communications nodes network manager 22 may be operatively connected to the second military MANET node 20b through a logic link 37d. In some implementations, the beacon receiver may be integrated into the network manager 22. The beacon receiver receives the radar schedule sent along the beacon signal and the beacon receiver integrated into the network manager directs the nodes 20 to share the spectrum submissively to the radar 14.

In another embodiment the first and second military MANET nodes 20a, 20b may be connected through physical links to the military network manager 22. In this scenario, physical links 36c and 36d would replace logic links 37c and 37d, respectively.

ISS 12 is operatively connected to a first self-organizing network 26a through a logic link 37e. The first self-organizing network 26a is directly connected to a fast in-band sharing WiFi network 34. ISS 12 is also operatively connected to a second self-organizing network 26b through a logical link 37f. The second self-organizing network 26b is directly connected to a fast in-band sharing cellular network 32.

A first commercial network manager 24a may operatively connect ISS 12 to the first self-organizing network 26a through two physical links, namely physical link 36h with ISS 12 and physical link 36i with first self-organizing network 26a. A second commercial network manager 24b may operatively connect ISS 12 to the second self-organizing network 26b through two physical links, namely physical link 36j with ISS 12 and physical link 36k with second self-organizing network 26b. In some implementations, the beacon receiver is implemented in one of the commercial network managers 24. Wherein the beacon receiver receives the beacon signal containing the radar schedule and the beacon receiver then informs the commercial node 21 (such as a cell phone) the available time or frequencies available for spectrum sharing.

The commercial spectrum access system 18 may be operatively connected to slower out-of-band sharing cellular network 28 through logic link 37g. Additionally, commercial spectrum access system 18 may be operatively connected to slower out-of-band sharing WiFi network 30 through logic link 37h.

A third commercial network manager 24c may operatively connect commercial spectrum access system 18 to the slower out-of-band sharing WiFi network 30 through two physical links, namely physical link 36m with the commercial spectrum access system 18 and physical link 36n with the slower out-of-band sharing WiFi network 30. In another alternative embodiment, a third self-organizing network 26c may operatively connect commercial spectrum access system 18 to the slower out-of-band sharing cellular network 28 through two physical links, namely, physical link 36o with the commercial spectrum access system 18 and physical link 36p with the slower out-of-band sharing cellular network 28.

A first commercial node 21a, such as a cellular or small cell base station, operates on and is connected to cellular network 28. A second commercial node 21b, which may be identical or distinct from first commercial node 21a, operates on and is connected to WiFi network 30. A third commercial node 21c operates on and is connected to cellular network 30. A fourth commercial node 21d operates on and is connected to WiFi network 32. In some implementations, the beacon receiver is implemented directly into one of the commercial nodes 21. Wherein the beacon receiver receives the beacon signal containing the radar schedule and the beacon receiver then informs the commercial of the military node 20 the available time or frequencies available for spectrum sharing.

System 10 and its associated method for sharing spectrum between radar 14 and wireless communication nodes 20 or 21 using an advanced beacon signal (shown generally as 62) directing spectrum traffic to avoid interference between the radar 14 and communications devices (i.e., nodes 20 or 21). In this scenario, ISS 12 prevents an interference to radar 14. ISS 12 directs spectrum sharing through either the Federal Spectrum Access System or the Commercial Spectrum Access System operatively coupled to military or commercial network managers. Additionally, various interfaces enabling connection to the communications networks.

In operation and with respect of FIG. 1, radar 14 communicates with communication devices (military MANET nodes 20 or commercial nodes 21) through ISS 12. Particularly, radar 14 makes its transmission schedule available to ISS 12 to share obfuscated radar 14 schedule information with the plurality of communications nodes, such as nodes 20, or other nodes 21 operating in any of the networks 28, 30, 32, or 34. The radar schedule information may be encrypted and only relevant portions detailing available spectrum to be shared with the ISS 12 to allow the beacon transmitter 25 to generate the beacon signal. The plurality of communications nodes 20 or 21 alter their transmit schedules based on the time and frequency locations (e.g.: time duration leases of specific channels), which have been made available to them by the radar 14 as received in obfuscated format at the beacon receiver. In one particular embodiment, the altering of the communications nodes' transmit schedules enables spectrum sharing in real time while causing no interference to the radars 14. Further, architecture associated with present disclosure is backward compatible with commercial architecture and allows fast in-band spectrum sharing as well as slower out-of-band spectrum sharing.

ISS 12 harmonizes with the architecture that is proposed in the United States 3.5 GHz Citizens Broadband Initiative which is ordinarily referred to as the Spectrum Access System (SAS). The FCC's current 3.5 GHz Notice of Propose Rule Making (NPRM) focuses on 3.55 GHz to 3.7

GHz (i.e., out-of-band) which is outside a co-channel radar operating zone of 3.1 GHz to 3.5 GHz (i.e., in-band). Thus, the architecture of system 10 using the SAS for the current NPRM is likely to result in relatively slow spectrum sharing, as compared to the faster scale spectrum sharing that may be required when the communications node(s) systems are operating co-channel to the radar. The faster information sharing will be enabled not only by the SAS, but also newly developed components such as the RF Link (e.g.: advanced beacon) as a forward information transport mechanism and satellite communications (SATCOM) for the reverse path. As used herein, the term "forward" or "forward direction" refers to the information flow in the direction from the radar to the communications node(s), and the information flow in the direction from the communications node(s) to the radar will be termed as "feedback" or the "reverse direction".

Radar(s) 14 is an agile emitter of a signal containing sensitive information about which spectrum the radar is occupying. For example, the radar 14 may have different states and is able to transfer/hop frequency bands. Radar 14 has different bandwidth configurations, each bandwidth configuration set at different megahertz. In this example, radar 14 may have the ability to move its transmission signal in predetermined spectrum range of 400 MHz frequency band, but only occupying 200 MHz at a time, thus leaving 200 MHz of gray space available for use by communication nodes. ISS 12 receives the broadcasted occupied spectrum by the radar and directs the communications to utilize the unoccupied gray spectra. The term "gray space" referred to herein is defined as spectrum within a frequency channel (such as the frequency channel from 3.1 GHz-3.5 GHz) that is temporarily not being used. The term "white space" referred to herein is defined as spectrum closely adjacent but outside a frequency channel.

Further, radar 14 signal within its transmission band is not static; the radar can hop around to different frequencies. Thus, radar 14 communicates with ISS 12 to indicate that it is hopping in a certain pattern and as ISS 12 adapts to radar 14 frequency movement/hopping, then ISS 12 adjusts free spectrum parameters notifying communication nodes occupy those empty white spaces or gray spaces.

Fast spectrum sharing refers to spectrum sharing in-band. For example, assume this same radar is operating in the frequency band from 3.1 GHz to 3.5 GHz, but its pulses hop between frequencies within the band and leave unused portions of the frequency band. Thus, fast in-band sharing could occur when the radar is transmitting signal in a 200 MHz range from 3.1 GHz to 3.3 GHz and a node 20 or 21 could occupy gray space in-band spectrum at 3.4 GHz until the radar pulses occupy (i.e., hops) to that frequency. Fast spectrum sharing opens up the gray space spectrum in this frequency channel for a short time period when not used by radar. Or, while the radar is transmitting its signal in a range from 3.1 GHz to 3.3 GHz and a node 20 or 21 could occupy gray space spectrum in a frequency range from adjacent 3.3 GHz to 3.5 GHz until the radar pulses occupy (i.e., hops) that original frequency and need to occupy the gray space. At that point, the radar could occupy the frequencies from 3.3 GHz to 3.5 GHz and the new gray space within the channel would be in a range from 3.1 GHz to adjacent 3.3 GHz.

Slow spectrum sharing refers to the type of spectrum sharing that is out-of-band. For example, assume the radar 14 can alter is broadcast frequency in a 400 MHz range of spectrum channels between 3.1 GHz to 3.5 GHz. Thus, if the radar is occupying the frequency band from near 3.5 GHz, then slow spectrum sharing would make available the unoccupied spectrum out-of-band spectrum that is near the radar, for example the out-of-band spectrum may be in a range 3.55 GHz to 3.7 GHz.

This type of fast in-band sharing and slower out-of-band sharing is distinct from prior teachings that were simply binary. These teachings indicate that if a radar is capable of transmission in frequency spectrum channels between 3.1 GHz to 3.5 GHz and is occupying any frequency band from 3.1 GHz to 3.3 GHz at a particular time, then no other node/communication device can share entire in-band spectrum between 3.1 GHz to 3.5 GHz. System 10 overcomes this deficiency by enabling both out-of-band slow spectrum sharing and in-band fast spectrum sharing.

The advanced beaconing and spectrum sharing encompassed by system 10 increases fidelity over the previous binary (i.e., on/off) spectrum sharing system. The previous binary spectrum sensing approach for sharing spectrum merely sensed if any portion of the predetermined spectrum band was being used: (i) occupied, or (ii) unoccupied. For example, the previous approach prevents any portion of spectrum sharing to occur if a radar is within the 3.1 GHz to 3.5 GHz range, even though there may have been "free" gray space within that range. These previous teachings indicated that the spectrum was unavailable, but the node desiring to share the spectrum does not know until what time it will not be allowed to use the spectrum. Thus, previous binary system must continue detecting and detecting and then leave the spectrum when it senses the radar coming online.

ISS 12 of system 10 overcomes this inefficiency by acting as a director to conduct spectrum traffic to efficiently share the spectrum. When the radar emits its signal beam (often a high powered signal beam), the ISS 12 searches the known radar frequencies and beam pattern. ISS 12 derives from the radar signal beam pattern the availability of spectrum frequencies and for how long (i.e., the available period). The radar signal allows the ISS 12 to grant the communication nodes (i.e., an end user) an ability to submissively use portions of the unoccupied spectrum.

ISS 12 enables cooperative sharing of the radar 14 spectrum which provides an advantage over previous systems. Namely, in previous conventional spectrum sharing systems, the detection of radars was not a priority. These systems simply "heard" the radar and moved away from the radar-occupied spectrum. In a sense, interference already existed because the node would not leave the spectrum until it "heard" the radar. Thus for a short period of time, the spectrum channel was occupied by two devices, the radar and the communicated device. System 10 effectively eliminates interference in the spectrum because ISS 12 directs communication nodes (i.e., either military nodes 20 or commercial nodes 21) to leave the spectrum proactively, before an interference occurs; not shortly after detecting an interference as taught in the previous spectrum sharing systems.

System 10 distinguishes itself from previous systems by avoiding interference before it occurs. ISS 12 recognizes which spectrum channels the radar will occupy at what times without identifying the actual physical location of the radar. Beacon transmitter 25 sends out the advanced beacon containing radar schedule information to preemptively enable communication nodes to avoid the radar signal thus avoiding interference before it occurs.

Radar 14 generates an available spectrum signal that the advanced beacon signal utilizes to then generate two pieces information. First, a slow sharing mechanism, and second a fast sharing mechanism. The radar's location information and how the radar generates the spectrum occupying schedule is not shared with the end user.

The radar 14 broadcasts certain characteristics that can be announced to the beacon transmitter for transmission to the nodes. This is the information that the beacon carries from the beacon transmitter 25 to the beacon receiver 27. The amount information that goes into the beacon signal 62 is variable/flexible and depends on how much radar information is available. Some radars may broadcast more information than others. One exemplary radar is identified as a "SPY1" radar that is used for ballistic missile defense. The radar's information is obfuscated in a manner that the obfuscation process sends out sanitized information and tells the receiver(s) (i.e., the communication nodes) what frequency bands/spectrum the radar is willing to share. The obfuscated radar information also indicates what channels at certain times for the nodes. Then, the nodes have to adjust the priorities of the radar to be able to share spectrum.

ISS 12 utilizes a compaction format to represent the radar schedule and such that the radar schedule provided to the nodes (through the advanced beacon signal sent form the beacon transmitter to the beacon receiver). Compacting the radar schedule ensures the schedule is transmitted efficiently, by not consuming the too much bandwidth.

In some instances, the obfuscated radar location is already included in the schedule that is transmitted. One possibility is that the schedule is not directly shared with the nodes. Rather the radar grants permission for the use of certain time/frequency combinations without revealing details of its operation. In this case "permissive" policies are used. In other cases, information obfuscation is used consisting of obfuscation of the radar location, as well as obfuscation in the radar schedule, such that an adversary is not able to decode the schedule and use that against the radar to implement clever interference techniques. This instance would be coupled with "restrictive" policies such that the obfuscated schedule shared by the radar cannot be interfered with.

System 10 may operate under some the following exemplary and non-limiting parameters. Typically, radar 14 can predict its future spectrum usage up to 100 milliseconds (ms). Thus, system 10 latency should be less than 100 ms for effective in-band sharing of the spectrum between the radar 14 and the nodes 20 or 21. Further, radar typically has a long term scheduler that plans events out in time and a short term scheduler that plans radar schedules on a finer time-scales. The radar short term scheduler may make changes to the schedule at any time, based on event pop-ups.

The information flow in the forward direction from the radar to the communications node(s) has certain amount of time sensitivity associated with it since the radar can predict its schedule for a finite time duration into the future. As stated previously, this time duration could be as low as 100 ms. Further, the forward direction is likely to carry important command and control information that may require the secondary users of the spectrum (e.g.: the military or the commercial communications node(s)) to follow certain directives that include ceasing all their transmissions. Thus, the information moving in the forward direction needs to be delivered to the end users in a timely fashion, securely, and with low latency.

On the other hand, the information in the reverse direction is likely to carry performance statistics which does not have any strict timing requirements associated with them. This means that the latency in the reverse direction could be much higher, on the order of a few seconds. The reverse ISS, however, needs to assist in mechanisms for mis-configured node detection and disabling. They enable "positive control" on the wireless devices.

While the spectrum sharing enabled by ISS 12 of system 10 has efficient advantages over traditional simple spectrum sharing, operators of system 10 still do not want commercial systems to be observing radar 14 waveforms. The waveform is designed for a certain purpose and it is undesirable for commercial systems to know or learn what the waveform is performing.

Further, it is undesirable for the commercial systems to know the location of radar 14. The advanced beaconing and spectrum sharing provided encompassed by system 10 protects against such a scenario by obfuscating the radar location. Obfuscating the radar location and ensures that the radar parameters are not given away to the commercial nodes 21.

The advanced beacon 62 of ISS 12 enabling spectrum sharing does not add any additional geolocation vulnerability to radar than what already exists. It is well known that it is difficult to perform geolocation on low power and low SNR signals. Additionally, it is difficult to perform geolocation in lower frequencies, inasmuch as lower frequencies yield lower angular resolution, which needs larger antennas. Radar frequency hopping, asynchronicity, smaller bandwidth and spreading further thwart and combat geolocation by another. The advanced beacon 62 from the beacon transmitter 25 in the form of an RF Link for information sharing is not likely to add vulnerability than what already exists because it operates in an environment where the radar frequency hops, has asynchronicity, and has a smaller bandwidth.

However, in one embodiment the beacon signal (i.e., the RF link) should only be ON when the Radar is operating and spectrum sharing is desired. In general, geolocation accuracy increases with the transmit power. Higher carrier frequency operation will require larger transmit power. Also higher frequency operation means greater angular resolution. Hence a lower power and lower frequency operation for this low latency advanced beacon 62 is preferable.

The waveform of the advanced beacon 62 (i.e., the RF link) may include some of the following characteristics. The advanced become waveform may use single carrier Direct Sequence Spread Spectrum (DSSS) operation with 8 chips/bit of spreading. Further, the advanced become waveform may be a robust Differential Quadrature Phase Shift Keying (DQPSK) with Rate ½ Convolutional Code. Further, the advanced beacon waveform may use a Constant Amplitude Zero Auto-correlation (CAZAC) waveform such as Frank, Zadoff-Chu or Suehiro Sequences. And, the advanced beacon waveform may utilize an inter-beacon networking period used to allow coordination between other beacons. (See also FIG. 5).

Figure 2:
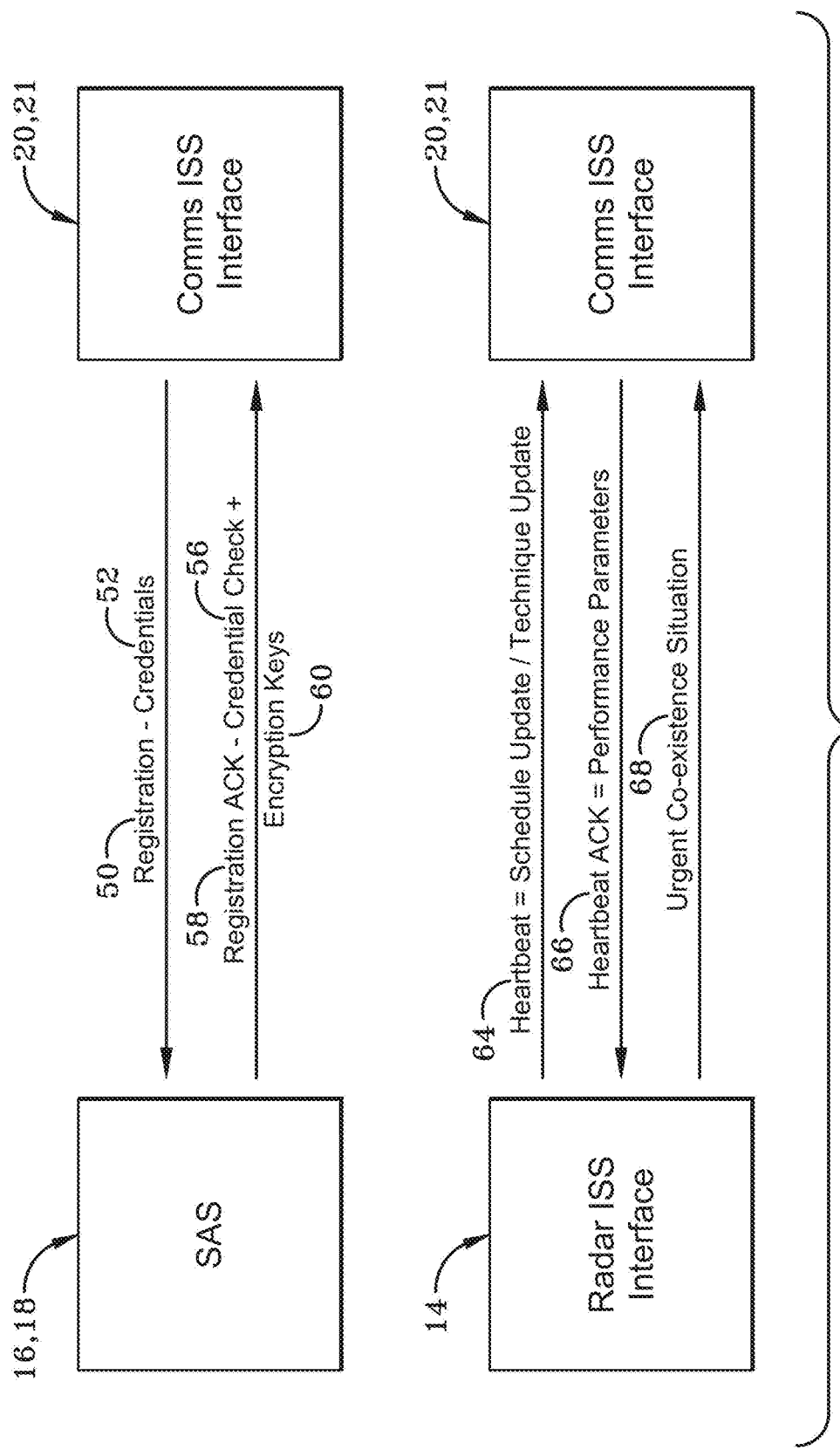
FIG. 2 (FIG. 2) is a generic representation of some of the operable components within an information sharing subsystem according to one embodiment.

FIG. 2 is a flow chart depicting the registration of communication nodes with the radar. Each of the communications node(s) 20 or 21 will be responsible for registering itself with the radar 14 using a registration message 50 including node credentials 52. This is encompassed in software or middle ware that either resides on the radar or is associated with it. Each of the communication nodes 20 or 21 may include an ISS interface to effectuate the coupling of the beacon receiver 27 to the node 20, 21. This interface is generally shown as "Comms ISS Interface" in FIG. 2. The registration process may occur over a SATCOM reverse link 63 (e.g.: military comms and radar spectrum sharing). During the registration process, the nodes 20 or 21 will provide their credentials 52 (e.g.: device ID, serial number, public keys etc.). The comms nodes may also register with the Commercial or Federal Spectrum Access System (C-SAS or F-SAS) using internet connectivity (e.g.: commercial comms and radar spectrum sharing). The Global Database (e.g.: Federal Spectrum Access System 16 or Commercial Spectrum Access System 18) will validate the credentials (i.e., credential check 56) and then provide a registration acknowledgement 58 (REG-ACK) for the registration which will in turn send out the credentials (e.g.: encryption keys 60) that are needed to decrypt the information from the ISS. Once registration is complete, spectrum sharing may begin.

Once the spectrum sharing begins, important spectrum sharing information will be conveyed to the communications node(s) nodes 20 or 21 through the low latency forward link 62 (e.g.: Advanced Beacon) from radar 14 coupled to the ISS 12. One exemplary low latency forward link 62 is a heartbeat message 64 (HBT). A heartbeat acknowledgement (HBT-ACK) message 66 may be used to send the performance statistics back to the radar 14 on slower time scales. This feedback enables the radar 14 to know how much capacity is required by communications systems such that it only allocates the capacity needed allowing for greater obfuscation of radar operations. This mechanism also allows the radar to better manage the spectrum and control the interference situations.

Each of the communications devices (i.e., commercial node 21 or military node 20) that desires to share spectrum registers with the military/government or Commercial Spectrum Access System, and receives the registration acknowledgement (REG-ACK). The communications system receives the security credentials to decrypt and decode the information contained in the beacon 62 as a result of the registration process. The communications devices, their network managers or the SON controllers receive periodic heartbeat message. The heartbeat message may be delivered via the Advanced Beacon 62 or may be communicated from either of the government or Commercial Spectrum Access System.

The advanced beacon 62 may be either a wireless signal, or a signal transmitted over a wired medium such as optical fiber, cable or a telephone line. The advanced beacon 62 may include information that allows spectrum sharing between the radar 14 and communications systems, such as nodes 20 or 21. This spectrum sharing information carried within the beacon 62 signal may comprise one or more of the following: (i) a time and frequency instructions/map of the spectrum channels that are available for use by the communication systems (i.e., nodes 20 or 21); (ii) instructions for available spectrum channels for various geographic areas over a certain time duration; (iii) a location of the radar; (iv) a radar schedule detailing over a long duration for slow spectrum sharing; (v) a radar schedule detailing over a short duration for fast spectrum sharing; (vi) radar transmit power; (vii) radar bandwidth; (viii) channelization of the spectrum; (ix) a frequency avoidance distance (for example, "do not operate within $X^1$ MHz of a given frequency, where $X^1$ is a avoidance distance numeral, such as 10 MHz, or 50 MHz 100 MHz, or 200 MHz, or 400 MHz, or 1000 MHz); (x) an azimuth avoidance distance (for example do not operate within $X^2$ degrees of a given azimuth, where $X^2$ is an avoidance distance number, such as 1 degree, or 5 degrees, or 20 degrees, or 45 degrees, or 90 degrees, or 135 degrees, or 180 degrees); (xi) an elevation avoidance distance (for example do not operate within X3 degrees of a given elevation, wherein X3 is an avoidance distance number, such as 1 degree, or 5 degrees, or 20 degrees, or 45 degrees, or 90 degrees, or 135 degrees, or 180 degrees); (xii) requirements for the communications systems (i.e., military nodes 20 or commercial nodes 21); (xiii) a time reference; and (xiv) Necessary characteristics of the Comms devices (i.e., either node 20 or node 21) to effectively share the spectrum with the radars (e.g.: Max allowable transmit power, Max Bandwidth, Spectrum Mask requirements).

When the advanced beacon 62 is embodied as a wireless signal, the wireless advanced beacon signal includes at least (i) long range capabilities (i.e., of the order of at least 40 km); (ii) point to multi-point operation; (iii) resilience to multi-path; (iv) robustness; (v) anti-jam properties; (vi) low probability of exploitation; (vii) spectrum efficiency; and (viii) support for multiple radars.

The advanced beacon 62 signal is transmitted in/across at least one of the following: (i) in the High Frequency (HF) Band; (ii) in the Very High Frequency (VHF) Band; (iii) in the Ultra High Frequency (UHF) Band; (iv) in the L Band (1 GHz to 2 GHz); or (v) in the S-band. Further, in one embodiment beacon 62 is a chirp modulated signal. Also, in another embodiment, the radar itself acts as a beacon transmitter and sends out a beacon signal on an opportunistic basis. Advanced beacon 62 signal may use orthogonal spreading codes (e.g.: Walsh Codes, or Barker Codes) to convey information regarding spectrum sharing. Alternatively, beacon signal 62 may use good correlation codes (e.g.: gold codes), or Zadoff Chu sequence(s), or suehiro chirp sequences with digital modulation data riding on top of these signals.

An Urgent Co-existence Signaling (UCS) message 68 is used to convey an urgent co-existence situation from radar 14 to nodes 20 or 21, such as when the radar 14 wants to take full control of the spectrum and wants to request the communications node(s) 20 or 21 to shut down their operation until a certain time. Collectively, these mechanisms enable positive control on the wireless devices sharing with the radar systems.

Figures 3A, 3B:
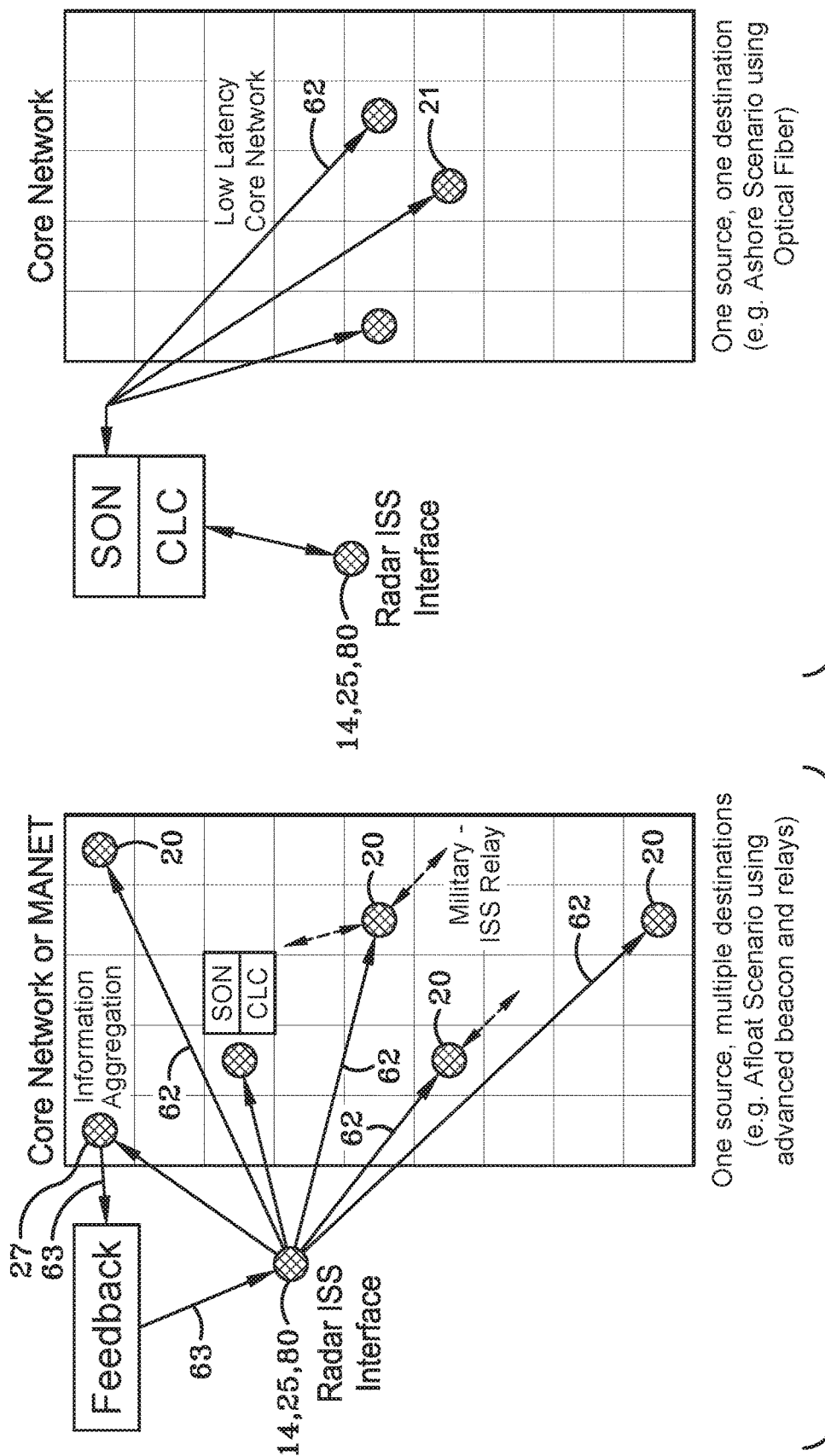
FIG. 3A (FIG. 3A) is a general representation of the spectrum sharing system in an afloat scenario according to one embodiment.
FIG. 3B (FIG. 3B) is a general representation of the spectrum sharing system in an ashore scenario according to one embodiment.

System 10 may be implemented on water (i.e., an afloat scenario; FIG. 3A) or on land (i.e., an ashore scenario; FIG. 3B). FIG. 3A and FIG. 3B depict generic representations of the system 10 and ISS 12 architecture and the difference between the afloat scenario and the ashore scenario.

In the afloat scenario (FIG. 3A), radar 14 is operating aboard a ship. In the ashore scenario (FIG. 3B), radar 14 is operating on land. The Afloat scenario includes a radar ISS interface 80, which may be incorporated in radar 14 that will communicate with multiple military Mobile Adhoc Network (MANET) nodes 20.

The forward communications from radar 14 to MANET nodes 20 may be facilitated using the RF Link (also known as the advanced beacon 62) whereas a reverse Link 63 may be implemented using SATCOM.

In the ashore scenario (FIG. 3B), radar 14 also includes the radar ISS interface 80 to communicate with multiple commercial nodes 21. Neither the radar 14, nor the (commercial) communications node(s) 21 move. The stationary positioning of nodes 21 and radar 14 allows the underlying internet infrastructure to be facilitate through the optical fiber or cable backbone network. Hence, the advanced beacon information transmits across/over the existing backbone network (e. g. cellular infrastructure, cable or optical). In other words, this method of transmitting the spectrum sharing information using an advanced beacon in an ashore scenario over the existing backbone network may be termed as a virtual advanced beacon.

Figure 4:
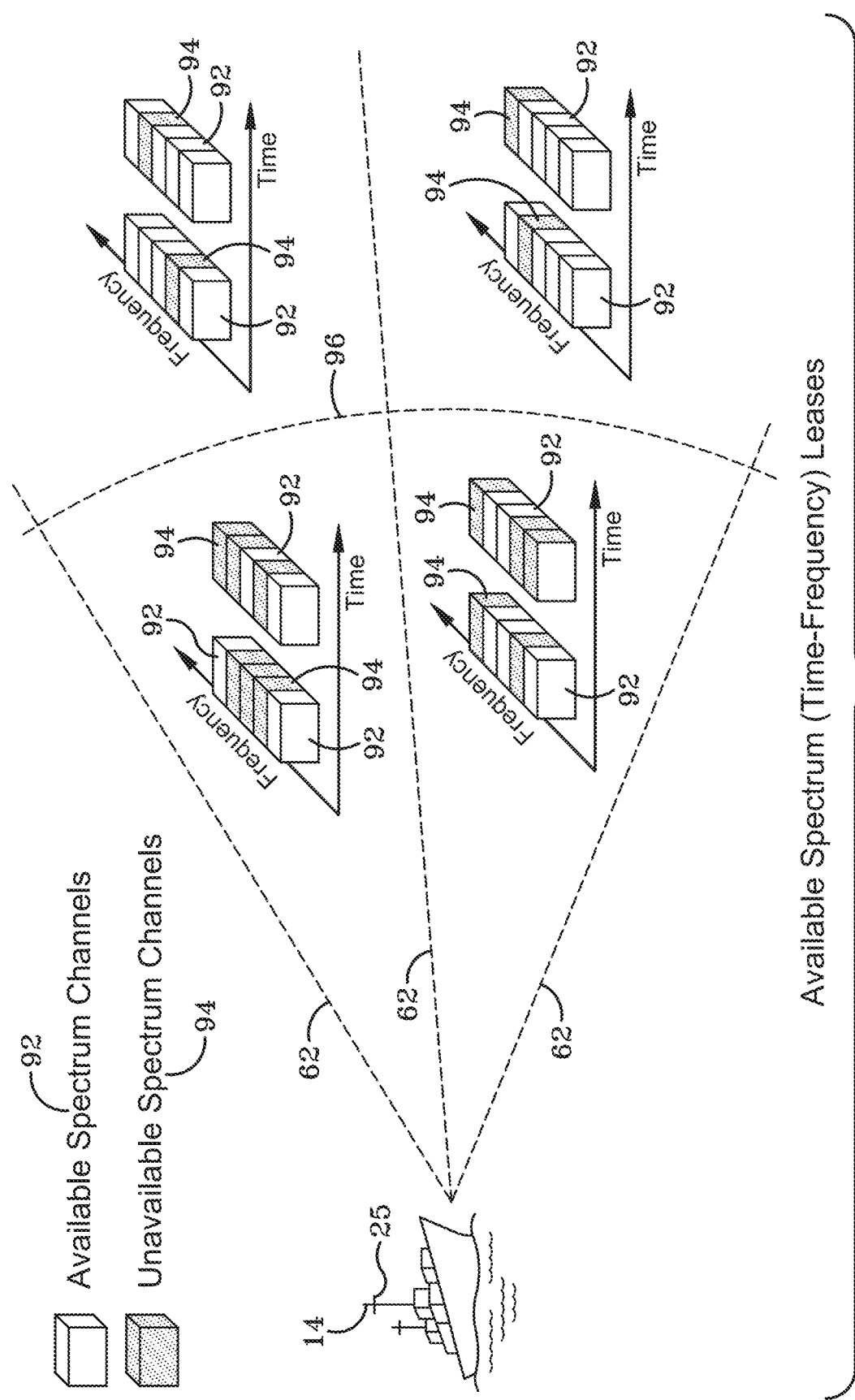
FIG. 4 (FIG. 4) is a representation of the radar schedule availability and leases where the radar pre-computes an available time-frequency slot for a communication node at a particular location.
Figure 8A:
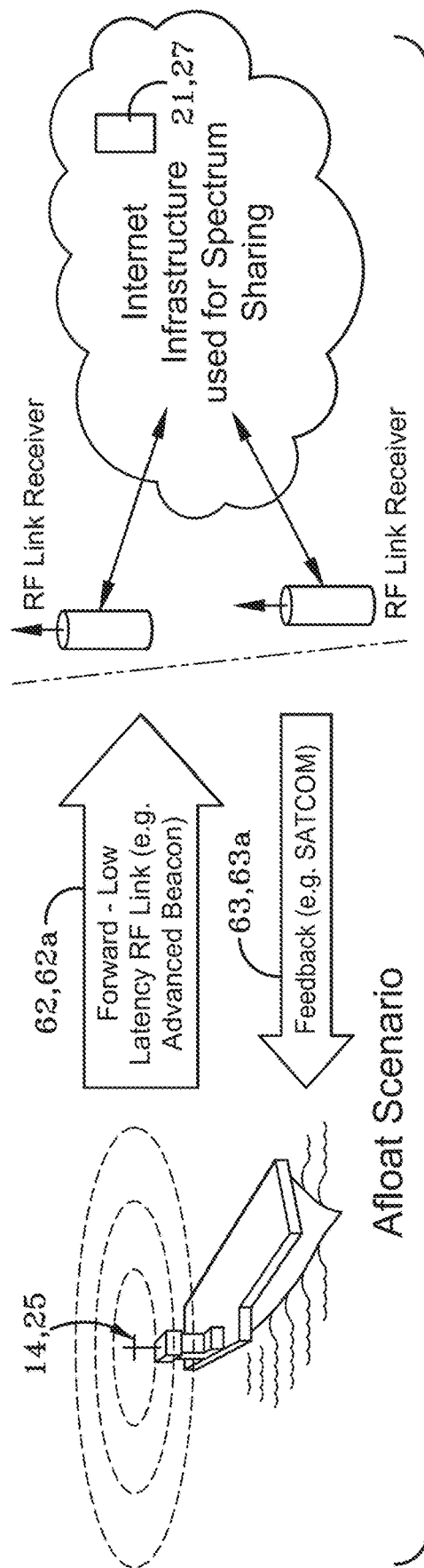
FIG. 8A (FIG. 8A) depicts commercial ISS components for the afloat scenario according to one embodiment.
Figure 8B:
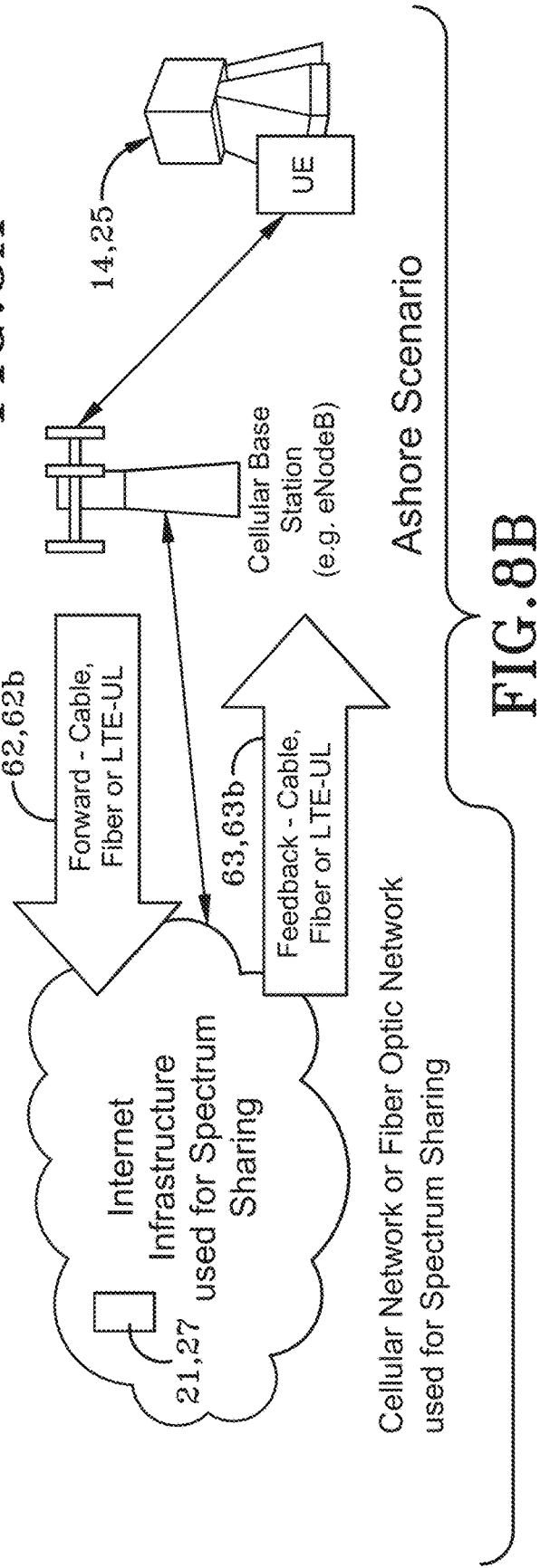
FIG. 8B (FIG. 8B) depicts commercial ISS components for the ashore scenario according to one embodiment.

FIG. 4 details the radar schedule where the radar, through the advanced beacon, broadcasts to nodes 20 or 21 the available spectrum channels 92 and the unavailable spectrum channels 94 at a certain time (e.g., which channels are available for lease). The radar schedule is based on its predicted future schedule. The radar ISS interface 80 pre-computes the time-frequency slots that are available (shown generally as 92) and the time-frequency slots that are unavailable (shown generally as 94) to the communications nodes 20 or 21 at particular location in its azimuth 96.

The radar schedule detailing spectrum availability is based, at least in part, on the performance that the radar desires in terms of the amount of isolation it needs from the communications nodes 20 or 21. For example, if the radar requires more isolation then less spectrum is available for the communications nodes 20 or 21. If the radar requires less isolation then more spectrum is available for the communications nodes 20 or 21.

With continued reference FIG. 4, in one particular example the radar pre-computes the time-frequency availability map per geocast based on known models and broadcasts them as a bit stream of ['available', 'unavailable'] to the communication nodes 20 or 21. The term geocast refers to the delivery of information to a group of destinations in a network identified by their geographical locations. This example operates similar to the TV whitespace database but on faster and achievable timescales. This exemplary way of precomputing the time-frequency availability is a specialized form of multicast addressing used by some routing protocols for mobile ad hoc networks. Another advantage of this technique is that spectrum sharing information is precomputed by the radar ISS interface 80 for the comms systems (i.e., node 20 or node 21). This includes obfuscation of the radar operation. Hence without providing the location of the radar enough information is provided to the communication nodes to start sharing the spectrum.

Once the radar schedule is shared with the communications nodes 20 or 21, there are several ways in which mutual interference is reduced. One technique includes cooperative beam avoidance, where the communications nodes 20 or 21 remain silent during time-frequency slots that are unavailable 94 for their use, hence minimizing interference to the radar(s) 14.

The complete radar schedule including obfuscation have an average throughput requirement of few tens of kilobits per second (kbps) for the forward low latency RF Link 82 (i.e., the advanced beacon). Based on the estimate of the radar schedule up to 100 ms into the future, there is on average of up to 50 kbps of throughput per radar 14, in order to support the cooperative beam avoidance technique which includes the complete radar schedule.

FIG. 5 and FIG. 6 are colored graphs depicting general features relating the beacon signal 62 and its range (i.e., beacon range) based on beacon transmitter power (i.e., the left y-axis depicted in the graphs), the beacon required bandwidth which is proportional to the data rate (i.e., the x-axis depicted in the graphs. The color bar on the right side of the graph represents the approximate beacon range associated with a shown color. So for example, in FIG. 5, blue-based colors generally represent a beacon range of about 100 km or less, yellow-based colors generally represent a beacon range of about 150 km, and red/maroon-based colors generally represent a beacon range of about 200 km. Additionally for example, in FIG. 6, blue-based colors generally represent a beacon range of about 40 km or less, yellow-based colors generally represent a beacon range of about 65-75 km, and red/maroon-based colors generally represent a beacon range of about 80 km or more.

For example, referring to FIG. 5, in a high data afloat scenario (i.e., the left graph of FIG. 5), when the beacon signal transmitter 25 is transmitting the beacon signal 62 at a power of about 50 dBm/100 kHz at a bandwidth of about 500 kHz in the VHF spectrum of 80 MHz, then the beacon range is approximately 150 km (shown in generally yellow color). To accomplish this 150 km beacon transmit range, the radar height may be 15 m above ground and the beacon receiver height may be 3 m above ground. This is clearly advantageous as the beacon signal can have a range greater than 100 km with less than 20 watts of power at low VHF. Note, in the afloat scenario, much longer beacon range is needed since there are not many structures that can attenuate the signal. Additionally, FIG. 5 also depicts the beacon range from low data rate beacon signals (i.e., the right graph of FIG. 5) which can be interpreted with similar reference numerals. In each of the scenarios of FIG. 5, the respective data range, spreading factors, and required bandwidth (BW) are provide for each of the high data rate beacon and the low data rate beacon; please refer to FIG. 5 for these exemplary components.

For example, referring to FIG. 6, in a high data ashore scenario (i.e., the left graph of FIG. 6), when the beacon signal transmitter 25 is transmitting the beacon signal 62 at a power of about 50 dBm/100 kHz at a bandwidth of about 500 kHz in the UHF Band of 400 MHz, then the beacon range is approximately 70 km. In an ashore scenario, the beacon range of 70 km is sufficient since there are many structures such as trees, and buildings that can attenuate the signals. To accomplish this 70 km beacon transmit range, the radar height may be 15 m above ground and the beacon receiver be position 3 m above ground. This is clearly advantageous as the beacon signal can have a range greater than about 50 km with less than 500 watts of power at UHF. Additionally, FIG. 6 depicts the beacon range from low data rate beacon signals (i.e., the right graph of FIG. 6) which can be interpreted by similar reference numerals. In each of the scenarios of FIG. 6, the respective data range, spreading factors, and required bandwidth (BW) are provide for each of the high data rate beacon and the low data rate beacon; please refer to FIG. 6 for these exemplary components.

With general reference to FIG. 7A and FIG. 7B, advanced beacon 62 is different from a traditional beacon (e.g.: light house or a signal) but it carries actual information (e.g. in form of bits) that allows the other system to not only understand that the Primary User (e.g.: radar 14) is operating and needs to be protected, but also what the secondary users (e.g.: communications node(s) 20 or 21) need to do to co-exist with the radars 14. In one embodiment, the advanced beacon 62 provides low fidelity information (e.g.: commercial GPS) for sharing with the commercial node 21 or a higher fidelity and higher encryption information (e.g.: military grade GPS) that enables radar 14 and Military MANET nodes 20 share spectrum. It is also likely that there may be multiple types of advanced beacons depending on whether the nodes sharing the spectrum are commercial nodes 21 or MANET nodes 20. In each of these distinct beacons the two may be standardized through an international Standards Development Organization (SDO).

The exemplary two possible modes of radar schedule sharing are based on how much information the radar intends to share with the Secondary Users (Communications node(s) 20 or 21). For example, it may be desirable to only send out information such as secondary users can use the spectrum or not. In that case, a data rate of 1 kbps is more than enough. On the other hand, it may be desirable to share the entire radar schedule with obfuscation protecting the radar location. In this case one needs a data rate of approximately 50 kbps. Using simple spread spectrum techniques it is possible to accommodate multiple Radars.

In the afloat Scenario (FIG. 7A), a reliable advanced beacon communicates (bit error rate less than 10-3) up to 100 km from the radar with only 20 watts of transmit power if the advanced beacon 82 uses 80 MHz (VHF) nominal carrier frequency and bandwidth of 500 kHz corresponding to spreading gain of 4 chips per bit. Transmitted power can be increased for greater range or the spreading gain can be increased for more radars to perform spectrum sharing.

Similarly, if the operation is shifted to 400 MHz (UHF band) and it is the ashore scenario (FIG. 7B) (e.g.: radar and military MANET spectrum sharing), then a range of 50 km can be achieved with 500 Watts of power.

There are many types of legacy VHF and UHF transmitter systems on an integrated topside of the ship. It would be possible to use one of the legacy VHF/UHF antenna systems to implement the advanced beacon 82. Additionally, 470 MHz to 698 MHz (TV Band White Space) may be used since there are ordinarily no other systems on the ship that use these frequencies and the antenna systems can support it.

LTE Up Link (UL) is one exemplary transmission means for reverse link for ranges less than 10 km (e.g.: ashore scenarios). Radar 14 can carry an LTE user equipment terminal that can connect to the core network and rapidly share information. This is advantageous for the ashore scenario because issues may exists with moving platforms (i.e., a ship in the water) for a node to connect to, which may hinder the use of LTE UL as for the afloat scenario. Similarly, military MANET nodes 20 can be used for reverse link (i.e., feedback 63; FIG. 5B) in case of the ashore scenario. The use of military MANET as a forward link is hampered due to the MANET latency issues. Hence, typically the additional slots present on the Software Defined Radio (SDR) platform of a military MANET radio may be used for beacon transmitter and/or the receiver. Also, the beacon transmitter/receiver may be inserted into the radios using the concept of side-hat.

Ships and the radar sites are ordinarily equipped various kinds of SATCOM equipment (e.g.: INMARSAT, ASTIS MCE). The MANET networks are also equipped with SATCOM (e.g.: MUOS, INMARSAT-BGAN). SATCOM latencies are quite high, ranging anywhere from 50 ms to 400 ms. Hence SATCOM is not suitable for forward low latency RF Link (i.e., advanced beacon 82). However, due to its pervasive availability, and military and commercial dual use, SATCOM is highly favorable for feedback 63 or the reverse link. SATCOM may also be used for initial registration between the node and the radar local coordinator when the ship is about to enter a certain area.

With continued reference to FIG. 7A through FIG. 8B, system 10 having ISS 12 may include and implement the following components to achieve architectures enabling military to military and military to commercial spectrum sharing. In radar 14 to commercial communications node(s) 21 sharing, an exemplary afloat forward RF link (i.e., advanced beacon 62a (FIG. 8A)) is a lower frequency (e. g. VHF/UHF or L-Band) and reverse link or Feedback 63a (FIG. 8A) is SATCOM; and an exemplary ashore forward link 62b (FIG. 8B) or reverse link 63b (FIG. 8B) is a LTE Downlink (DL)/Uplink (UL) 62b. In radar 14 to military communications node(s) 20 sharing, an exemplary afloat forward RF link is an advanced beacon with higher level encryption 62c (FIG. 7A); an exemplary afloat reverse link 63c (FIG. 7A) is SATCOM; an exemplary ashore forward RF link is an advanced beacon 62d (FIG. 7B); and an exemplary ashore reverse link is a military waveform 63d (FIG. 7B).

Figure 9:
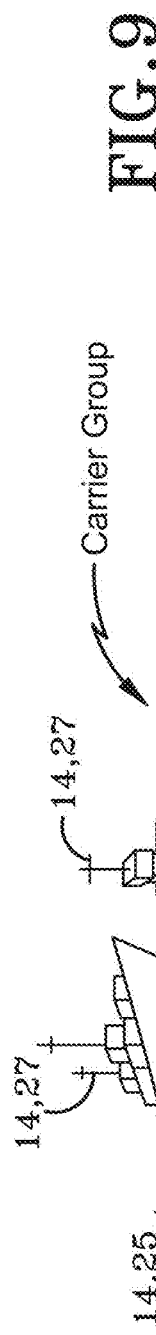
FIG. 9 (FIG. 9) shows advanced Beacon Scaling for Multiple radars according to one embodiment.

As generally depicted in FIG. 9, system 10 having ISS 12 may be scaled upwardly to include a plurality of radars, such as when a carrier group is moving/traveling by sea (see generally FIG. 9). The naval carrier group may be forwardly deployed and comprise roughly 7,500 sailors, an aircraft carrier, at least one cruiser, a destroyer squadron of at least two destroyers and/or frigates, wherein each of these ship has at least one of the plurality of radars 14.

Both, military as well as commercial ISS architecture consists of a generic messaging structure which includes the registration process (generally shown as 50; FIG. 2), heartbeat command and control messaging (generally shown as 66; FIG. 2), and the urgent coexistence signaling (generally shown as 68; FIG. 2). The generic messaging structure also includes transport mechanisms that facilitate secure and low latency transmission of the messages from the radar 14 to the communications node(s) 20 or 21 in its forward path, and monitoring and feedback information in the reverse path.

ISS 12 may also distinguish the information proliferation amongst the various nodes for the military and the commercial scenarios. For example the low latency forward path operation is facilitated using advanced beacon 62. For military systems, a beacon receiver 27 may exist on every node. Also as described above, the ISS interface in a radar 14 and Military MANET node 20 sharing scenario will exist on every node. On the other hand, there may only be one beacon receiver 27 and the local coordinator per geographic area and per network provider (i.e. a commercial spectrum sharing scenario). This choice comes from the fact that very likely millions of commercial nodes 21 (i.e., personal cell phones) will be deployed in a geographic area as compared to only hundreds of military MANET nodes 20.

This generic messaging structure is derived from many other commercial protocols and is likely to scale, with the number of radars and the number of nodes. The registration process happens before the spectrum co-existence begins and hence scaling is not a problem. Without registration, the communications nodes (military or commercial) do not receive the authentication and the encryption keys and hence cannot participate in the spectrum sharing.

FIG. 9 depicts an exemplary manner how system 10 will scale and accommodate multiple radars 14 (shown generally aboard floating ships in the carrier group, each naval vessel including at least one radar). An advanced beacon frame structure 101 that is aligned to a global position system (GPS). The frame structure 101 consists of inter-platform coordination time period followed by the heartbeat and spectrum sharing command and control data transmission 103.

The frame structure 101 for support of multiple radars includes one or more request to send (RTS) time slots 105 and one or more clear to send (CTS) time slots 107. Additionally, the frame structure includes the spectrum sharing data transmitted from multiple radars. The spectrum sharing information from various radars may be transmitted separately (e. g, at separate times or on separate frequencies). Further, the spectrum sharing information from various radars is transmitted all at once (e.g.: using orthogonal spreading codes).

During the inter-platform coordination, the platforms will choose a random RTS Slot and announce themselves. As shown in FIG. 9, one radar announces itself in RTS slot "0", another announces itself in RTS slot "1", and another announces itself in RTS slot "3."

The platforms (i.e., in this case radars) use unique training sequences that allow other platforms as well as the beacon receivers (i.e., either nodes 20 or 21) to perform synchronization and channel estimation functions. During the RTS Slot, the beacon transmitter will also inform other platforms the code (e.g.: spreading code) that it plans to use.

The CTS slots are used by the neighboring ships to acknowledge the presence of the nearby beacon transmitters and recognize that they will be sharing the beacon signal using certain codes. It is likely that the CTS message may be sent at much lower power since that is used for inter-platform coordination In one embodiment, various ships will transmit their heartbeat messages that contains the spectrum sharing data at the same time during the heartbeat data portion of the frames. All use codes (e.g.: good correlation spreading codes) that will allow the information from multiple ships to be decoded at the same time. There are several possibilities for the signaling such that signals from several radars can be decoded at the beacon receivers at the same time. These include the use of orthogonal spreading codes (e.g.: Walsh codes), low correlation codes (e.g.: gold codes) or zadoff chu or suehiro chirp sequences with digital modulation data riding on top of these signals. They have an added advantage since these sequences are orthogonal for various circular shifts. Also, these sequences may have complex amplitude zero autocorrelation waveform (CAZAC) properties.

The beacon signal 62 may be deployed in the following frequencies for the following reasons. The beacon signal 62 may deploy in the HF bands—30 MHz to 88 MHz to provide low geolocation vulnerability and great propagation (150 km) at low (100 Watts) transmit power. The beacon signal 62 may deploy in the VHF Band—88 MHz to 225 MHz, or 225 MHz to 400 MHz to provide low geolocation vulnerability and good propagation (80 km) at moderate (200 Watts) transmit power. Additionally, 400 MHz to 969 MHz is also possible for the same reason. Other shared spectrum bands (i.e., identify a TV Whitespace channel that is available based on the database service and use that for SSPARC control and coordination Other possibilities, which require spectrum sharing with other communication systems [cell phones, WiFi routers, etc.], significantly higher power and higher geolocation vulnerability). The beacon signal 62 may deploy in the L-Band: 969 MHz to 1205 MHz to provide high power operation but this may limit sharing with IFF systems. 1350 MHz to 1390 MHz is also possible. WNW, SRW, TTNT—1755 MHz to 1850 MHz may be moved to 2025 MHz to 2110 MHz. The beacon signal 62 may also deploy in the S-Band: 3.1 MHz or 3.5 MHz in the radar transmit frequency skirts.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. A method of sharing radar spectrum of one or more radars, comprising:
    providing at least part of a radar schedule for at least a portion of the radar spectrum to a beacon transmitter without providing a geolocation of the radars;
    sending a beacon signal from the beacon transmitter, wherein the beacon signal is a radio frequency (RF) link and carries spectrum sharing instructions to at least one communications node desiring to share the portion of the radar spectrum, wherein the sharing instructions comprises an in-band spectrum sharing instructions and an out-of-band spectrum sharing instructions;
    receiving the beacon signal at a beacon receiver, wherein the beacon receiver is operatively coupled to the at least one communications node and a network;
    directing the at least one communications node to occupy the portion of the radar spectrum based on the spectrum sharing instructions, wherein if the sharing instructions includes in-band sharing instructions, then the beacon receiver directs the at least one communications node to occupy a spectrum gray space within the portion of the radar spectrum and directs the at least one communications node to exit the portion of the radar spectrum when the portion of the radar spectrum needs to be re-occupied by the radars; and wherein,
    if the sharing instructions include out-of-band sharing instructions, then the beacon receiver directs the at least one communications node to occupy a spectrum white space adjacent the portion of the radar spectrum that are unoccupied by the radars; and
    wherein the method of sharing radar spectrum is adapted to prevent signal interference by requiring the at least one communications node to exit the portion of the radar spectrum desired to be re-occupied by the radars before any interference can occur.

2. The method of claim 1, wherein a frame structure comprises a plurality of request to send (RTS) spectrum slots and a plurality of clear to send (CTS) spectrum slots; and randomly selecting a RTS spectrum slot by one of the radars and announcing itself to another of the radars over the beacon signal, wherein the announcing is accomplished by establishing a training sequence enabling the other radars and the beacon receiver to synchronize and estimate channel functions.

3. The method of claim 2, wherein within the RTS spectrum slot, one of the radars informs other radars of an intended use code.

4. The method of claim 2, further comprising:
    acknowledging the presence of one of the radars announcing itself nearby to the other radars; and
    sending a CTS message at a lower power than that for an inter-radar coordination.

5. The method of claim 2, further comprising:
    transmitting heartbeat messages from the radars simultaneously during a heartbeat data portion of the frame structure as part of the information sharing subsystem; and
    decoding the heartbeat messages simultaneously.

6. The method of claim 1, further comprising:
    hopping, at the radars, between different radar transmission frequencies in the first portion of the spectrum;
    adapting, at the information sharing subsystem, to the hopping;
    adjusting, at the information sharing subsystem, free spectrum parameters and notifying the nodes to occupy those empty white spaces or gray spaces.

7. The method of claim 1, further comprising computing available time-frequency slots in a radar local coordinator to pre-compute the time-frequency slots that are available at a particular azimuth location.

8. The method of claim 1, wherein hierarchy monitoring dictates the spectrum sharing relationship such that:

if the radars requires more isolation, then less spectrum is available for the node; and if the radars requires less isolation, then more spectrum is available for the node.

9. The method of claim 1, further comprising:
registering the communications node with at least one of a government spectrum access system and a commercial spectrum access system, prior to the start of spectrum sharing;
exchanging the credentials of the communications node for authentication and security;
providing an encryption key from the government spectrum access system and/or the commercial spectrum access system, to the communications node; and
decrypting encrypted information included in the beacon signal.

10. The method of claim 1, further comprising aligning the beacon signal with a global positioning system (GPS).

11. The method of claim 10, further comprising establishing a frame structure when aligning the beacon signal with the GPS.

12. A spectrum sharing system, comprising:
at least one radar providing a radar schedule;
a beacon receiver configured to receive a beacon signal generated from a beacon transmitter, the beacon signal being a low latency radio frequency (RF) link carrying information that identifies the radar schedule and the beacon signal carrying spectrum sharing instructions carried by a heartbeat message comprising at least one of in-band spectrum sharing instructions and out-of-band spectrum sharing instructions; and
a communications node operatively coupled with the beacon receiver and configured to receive the spectrum sharing instructions, wherein if the sharing instructions include in-band sharing instructions, then the node is directed to occupy spectrum gray space in a portion of the spectrum and the node exits the gray space when the portion of the spectrum needs to be re-occupied by the radar; and if the sharing instructions include out-of-band sharing instructions, then the node occupies spectrum white space adjacent the portion of the spectrum that is not occupied by the radar and the node exits the white space adjacent the portion of the spectrum when the portion of the spectrum needs to be re-occupied by the radar.

13. The system of claim 12, wherein a location of the radar is obfuscated.

14. The system of claim 12, wherein the radar schedule is encrypted.

15. The system of claim 12, wherein an Urgent Co-existence Signaling (UCS) message is used by the radar to take control of the spectrum.

16. The system of claim 12, wherein the communications node is commercial and/or military.

* * * * *